O. BENDER.
PROCESS OF MAKING NITRIC ACID.
APPLICATION FILED APR. 15, 1907.

900,471.

Patented Oct. 6, 1908.

Witnesses
O. L. Jenkins
C. H. Griesbauer

Inventor
Oscar Bender
by H. B. Willson & Co.
Attorneys

UNITED STATES PATENT OFFICE.

OSCAR BENDER, OF NEU-BABELSBERG, GERMANY.

PROCESS OF MAKING NITRIC ACID.

No. 900,471.   Specification of Letters Patent.   Patented Oct. 6, 1908.

Application filed April 15, 1907. Serial No. 368,343.

*To all whom it may concern:*

Be it known that I, OSCAR BENDER, engineer, of 12 Berlinerstrasse, Neu-Babelsberg, near Berlin, Kingdom of Prussia, Germany, have invented new and useful Improvements in Processes of Making Nitric Acid, of which the following is a specification.

The present invention refers to a process for making compounds of oxygen directly from the elements at a high temperature.

The process consists in the mixture of oxygen and the substances to be oxidized being heated by a furnace to a high temperature, whereupon the hot gas-mixture is still further heated by an oxy-hydrogen flame. The oxy-hydrogen is suitably produced by superheated steam being blown into the hot space. The steam will dissociate at the high temperature and the oxy-hydrogen produced will mix with the heated gases. When this mixture begins to cool the hydrogen is united with the oxygen in an oxy-hydrogen flame, which still further heats the reaction mixture and produces the uniting of the oxygen with the substance to be oxidized. The oxids thus produced are thereupon drawn off by a cooler current of steam, whereby the yield is more favorably influenced.

Figure 1:
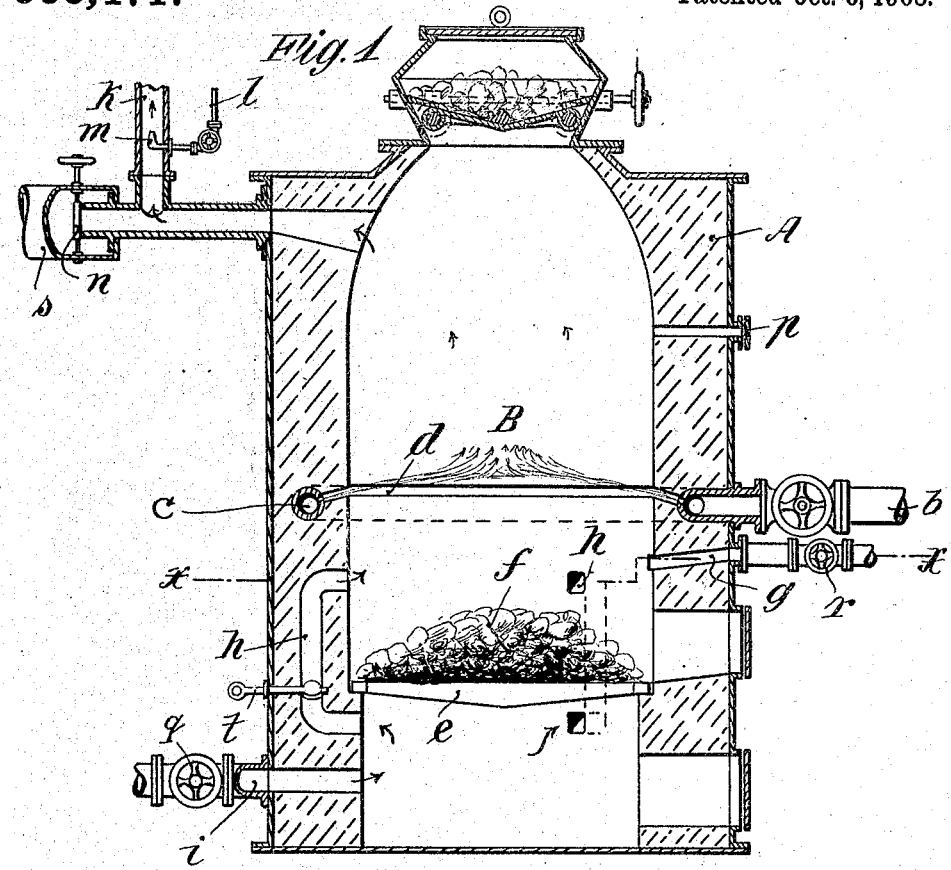
Figure 2:
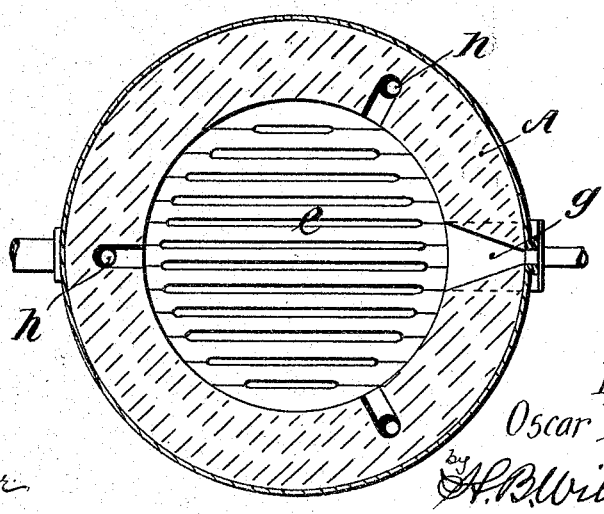

An arrangement, which might be employed for carrying out this process is shown in the accompanying drawing, in which Figure 1 is a longitudinal section, Fig. 2 a transverse section along X—X in Fig. 1.

The producer A made of fire-proof material and suitably well insulated has at its upper end a hopper $o$ for charging the fuel. In the lower part of the generator-shaft is arranged the grate-furnace $e$, $f$ is the fuel fire thereon. The tube $i$ arranged below the grate serves for the supply of atmospheric air, compressed air, oxygen and other substances required for the reaction. A second tube $g$ which may serve the same purpose is provided above the grates. Passages $h$ produce a communication between the space below the grate and the space above the fuel. These passages may also pass through the fuel. All tubes may be entirely or partly closable by means of valves, slides or the like $q$, $r$, $t$. Above the fuel where the temperature is highest an annular bent tube $c$ is fitted into the wall of the producer which communicates by an annular slot $d$ with the interior of the producer and by tube $b$ with a steam generating plant of any kind, so that it is possible to introduce high-pressure and superheated steam from all sides into the producer in a disk-like thin stream, and at such a part where the furnace produces under a strong draft the highest temperature, which can even be increased by supplying oxygen through tube $g$. The thus produced disk of steam which will fill out the whole section of the producer-shaft, is in a completely dissociated state, so that a little above this zone, where the gases have cooled down a little, say at B an oxy-hydrogen flame is produced, which will by its extreme heat again highly heat the substances mentioned above. A window $p$ allows of observing the reactions going on in the upper part of the producer. For carrying off the products the tube $k$ is provided, which may communicate by a slide or the like $n$ with the passage $s$ leading to the chimney. Into the exhaust-pipe $k$ is fitted a tube $l$ with a nozzle $m$, which serves to supply steam of a lower temperature, which flows in the direction of the escaping gases. This steam-jet produces a suction of the gas-mixture, a thorough mixing and at the same time by its lower temperature a cooling to such an extent, that the oxygen-compounds will not dissociate after being thus mixed and cooled.

The present process is of particular importance for producing nitrogen-oxygen compounds (nitric oxid, nitric acid) from the elements, as the process allows of a very economic production. As raw material in such instance will serve a mixture of oxygen and nitrogen, like atmospheric air, which is suitably enriched with oxygen and introduced in large quantities through the tube beneath the grate, say by means of a fan. The producer is charged with a layer of coal and heated by means of forced draft to a temperature far above 1000° C. On passing through the coal the air is deprived of the greater part of its oxygen; it is therefore advisable to replace such oxygen by introducing further quantities above the grate. By arranging fire-proof tubes or the like in the coal or by-passes, passages may however be created through which unchanged air may pass from below into the upper part of the producer. Owing to the great surplus of air the combustion in the producer is perfect and in the space above the grate a highly heated gas-mixture of carbonic acid, oxygen and nitrogen is produced. Into this mixture the overheated steam escaping from tube $c$ is introduced, dissociated whereby still hydrogen and oxygen *in statu nascendi* are produced. The producer may be lined in its upper portion with fire-bricks for producing a heat accumulator. The more above 1000° the temperature is, the better the steam is dissociated and the more nascent-oxygen is obtained. Somewhat above tube $c$ an oxy-hydrogen flame is produced by the cooling of the gases, which flame will by its extreme heat again highly heat the gases. Into the escaping gas mixture a steam-jet of lower temperature is introduced through nozzle $m$. This nozzle produces a suction and at the same time by its low temperature a cooling of and fixing of the nitro-oxygen compound produced.

I claim:

1. In the process of making nitric-acid, the improvement consisting in heating a mixture of oxygen and nitrogen in a furnace by a coal fire and subsequently by an oxy-hydrogen flame, the oxy-hydrogen being produced from superheated steam blown into the hot space above the fuel, the products of combustion being finally cooled immediately and then drawn off.

2. Process of making nitric-acid consisting in heating oxygen and nitrogen by heating a mixture of oxygen and nitrogen in a furnace by a coal fire and subsequently by an oxy-hydrogen flame, the oxy-hydrogen being produced from a steam superheated by the fire of the furnace and blown into the hot space above the fuel, the products of combustion being finally cooled immediately by a cooler steam current and then drawn off.

3. Process of making nitric-acid consisting in heating oxygen and nitrogen by heating a mixture of oxygen and nitrogen in a furnace by a coal fire and subsequently by an oxy-hydrogen flame, the oxy-hydrogen being produced from steam superheated by the fire of the furnace and blown into the hot space above the fuel, the products of combustion being finally cooled immediately by a cooler steam current, flowing in the direction of the escaping gases.

4. In the process of making nitric-acid, the improvement consisting in heating a mixture of oxygen and nitrogen in a furnace by a coal fire and subsequently by an oxy-hydrogen flame, the oxy-hydrogen being produced from steam superheated by the fire of the furnace and blown into the hot space above the fuel from all sides in a disklike thin stream, filling out the whole section of the producer, the products of combustion being finally cooled immediately and drawn off.

In testimony whereof I have hereunto set my hand in presence of two subscribing witnesses.

OSCAR BENDER.

Witnesses:
 WOLDEMAR HAUPT,
 HENRY HASPER.